(12) United States Patent
Hsu et al.

(10) Patent No.: US 9,919,755 B2
(45) Date of Patent: Mar. 20, 2018

(54) LEATHER BICYCLE SADDLE

(71) Applicants: Chung-Ying Hsu, Taichung (TW);
Chien-Shun Lai, Changhua (TW);
Chia-Wen Lee, Huatan Township,
Changhua County (TW)

(72) Inventors: Chung-Ying Hsu, Taichung (TW);
Chien-Shun Lai, Changhua (TW);
Chia-Wen Lee, Huatan Township,
Changhua County (TW)

( * ) Notice: Subject to any disclaimer, the term of this patent is extended or adjusted under 35 U.S.C. 154(b) by 0 days.

(21) Appl. No.: 15/130,023

(22) Filed: Apr. 15, 2016

(65) Prior Publication Data

US 2017/0297642 A1    Oct. 19, 2017

(51) Int. Cl.
*B62J 1/10* (2006.01)
*B62J 1/08* (2006.01)
*B62J 1/18* (2006.01)

(52) U.S. Cl.
CPC . *B62J 1/10* (2013.01); *B62J 1/08* (2013.01); *B62J 1/18* (2013.01); *B62J 2700/634* (2013.01)

(58) Field of Classification Search
CPC ......... B62J 1/10; B62J 1/08; B62J 1/18; B62J 2700/634
See application file for complete search history.

(56) References Cited

U.S. PATENT DOCUMENTS

| | | | | |
|---|---|---|---|---|
| 540,430 A | * | 6/1895 | Garford | B62J 1/10 297/204 |
| 540,431 A | * | 6/1895 | Garford | B62J 1/10 297/204 |
| 2,186,483 A | * | 1/1940 | Guidetti | B62J 1/08 297/207 |
| 2,395,346 A | * | 2/1946 | Schwinn | B62J 1/00 297/207 |
| 4,099,769 A | * | 7/1978 | Jacobs | B62J 1/10 297/204 |
| 5,597,202 A | * | 1/1997 | Andersen | B62J 1/00 297/195.1 |
| 9,216,788 B1 | | 12/2015 | Hsu et al. | |

* cited by examiner

*Primary Examiner* — Philip F Gabler
(74) *Attorney, Agent, or Firm* — Muncy, Geissler, Olds & Lowe, P.C.

(57) ABSTRACT

A leather bicycle saddle includes a leather cover, an arc support supporting the leather cover and having a front end terminating in a head abutment portion and a rear end affixed to a rear bottom side of the leather cover, and an adjustment device including a screw bolt holder affixed to a front bottom side of the leather cover, an adjustment screw bolt abutted against the screw bolt holder. The adjustment seat includes a seat block defining a mounting slot and a screw hole, and a stop block. The stop block is engaged into the open end of the mounting slot and stopped at the head abutment portion of the arc support against the closed end of the mounting slot. The screw hole of the seat block receives the adjustment screw bolt.

10 Claims, 8 Drawing Sheets

LEATHER BICYCLE SADDLE

BACKGROUND OF THE INVENTION

1. Field of the Invention

The present invention relates to bicycle saddles and more particularly, to a leather bicycle saddle.

2. Description of the Related Art

The covers of commercial bicycle saddles are mainly selected from the group of polyurethane and leathers. A bicycle saddle using a polyurethane cover generally has sponge or other elastic stuffing material (such as silicon rubber) stuffed therein to enhance the cushioning and shock absorbing effects. Bicycle saddles of this kind are suitable for use in different types of bikes. A leather bicycle saddle generally comprises a leather cover, an arc support for supporting the leather cover, and an adjustment and connection mechanism provided between the leather cover and the arc support. A leather bicycle saddle has a better texture and looking, however, because a leather bicycle saddle has no sponge or any other flexible material stuffed therein for cushioning, the leather cover will accurately transfer ground reaction forces to the buttocks of the bicycle rider, causing the bicycle rider to feel uncomfortable, and therefore, a leather bicycle saddle is not suitable for use in a mounting bike for off-road cycling, greatly limiting its applications.

Further, the tension of a leather bicycle saddle will become insufficient after a long use, causing the leather cover of the leather bicycle saddle to get depressed. In order to eliminate this problem, U.S. Pat. No. 9,216,788 B1 teaches the use of an adjustment screw bolt for driving an adjustment seat to move an arc support so that the arc support can stretch the leather cover of the leather bicycle saddle to achieve adjustment of the tension of the leather cover when it is moved. However, according to this prior art design, the tension of the leather cover will be slightly lowered after a long use of the leather bicycle saddle, at this time, the metal part of the arc support of the leather bicycle saddle and the metal screw sleeve that receives the adjustment screw bolt will be forced to continuously rub against each other as the bicycle rider shifts the center of gravity of the body during riding, producing disturbing noises.

SUMMARY OF THE INVENTION

The present invention has been accomplished under the circumstances in view. It is the main object of the present invention to provide a leather bicycle saddle, which provides a good cushioning effect, effectively improving the riding comfort.

It is another object of the present invention to provide a leather bicycle saddle, which reduces generation of noises and allows quick adjustment of the tension of the leather cover to the optimal flex.

To achieve these and other objects of the present invention, a leather bicycle saddle comprises a leather cover, an arc support and an adjustment device. The arc support is mounted at the bottom side of the leather cover, having a front end thereof terminating in a head abutment portion and a rear end thereof affixed to a rear bottom side of the leather cover. The adjustment device is mounted at the bottom side of the leather cover, comprising a screw bolt holder, an adjustment screw bolt and an adjustment seat. The screw bolt holder is affixed to the front bottom side of the leather cover, comprising a stop wall and a through hole cut through the stop wall. The adjustment screw bolt comprises a bolt head and a screw shank. The bolt head is abutted against the stop wall of the screw bolt holder and is rotatably received in the through hole of the screw bolt holder, the screw shank having one end thereof fixedly connected to the bolt head. The adjustment seat comprises a seat block and a stop block. The seat block comprises a mounting slot and a screw hole. The mounting slot and the screw hole are kept apart. The mounting slot defines a closed end and an opposing open end. The head abutment portion of the arc support is abutted against the closed end of the mounting slot. The stop block is detachably engaged into the open end of the mounting slot and abutted against the head abutment portion of the arc support. The screw hole is adapted for receiving the screw shank of the adjustment screw bolt. The adjustment seat is forwardly turnable about the head abutment portion of the arc support from a horizontal position to an inclined position.

By means of the technical feature that the adjustment seat is forwardly turnable about the head abutment portion of the arc support from a horizontal position to an inclined position, the leather cover of the leather bicycle saddle provides a cushioning effect like a spring or sponge to reduce the impact between the buttocks of the bicycle rider and the leather bicycle saddle, improving the overall riding comfort. Further, as the mounting slot and the screw hole are kept apart, the head abutment portion of the arc support is prohibited from direct contact with the screw bolt holder and adjustment screw bolt of the adjustment device, preventing generation of noises and allowing quick adjustment of the tension of the leather cover according to the desired flex.

Other advantages and features of the present invention will be fully understood by reference to the following specification in conjunction with the accompanying drawings, in which like reference signs denote like components of structure.

DETAILED DESCRIPTION OF THE INVENTION

Figure 1:
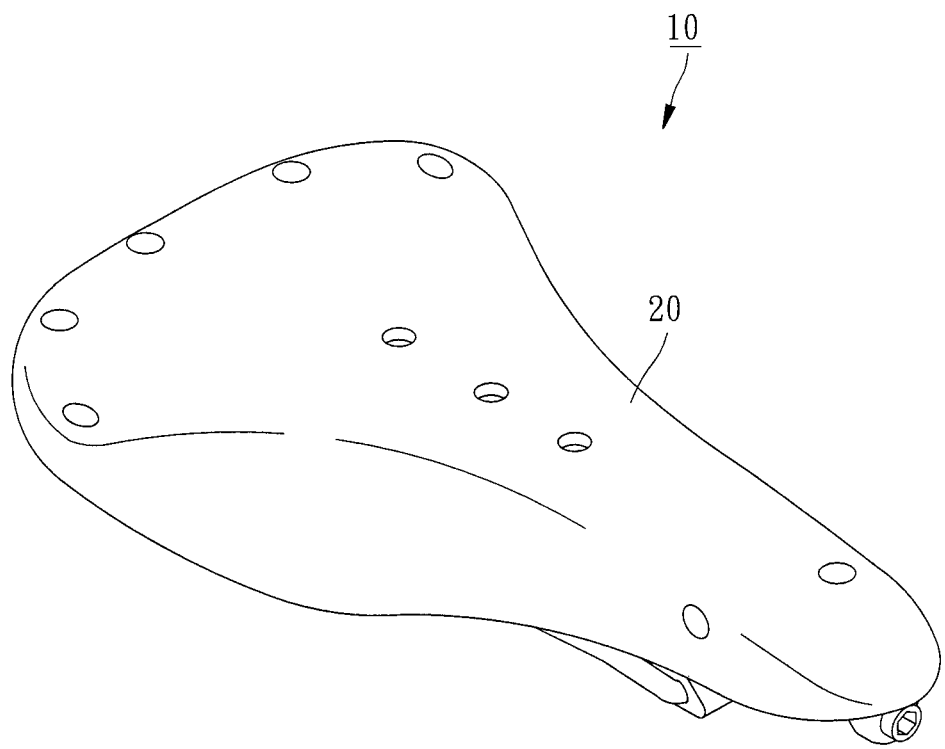
FIG. 1 is an elevational view of a leather bicycle saddle in accordance with a first embodiment of the present invention.
Figure 2:
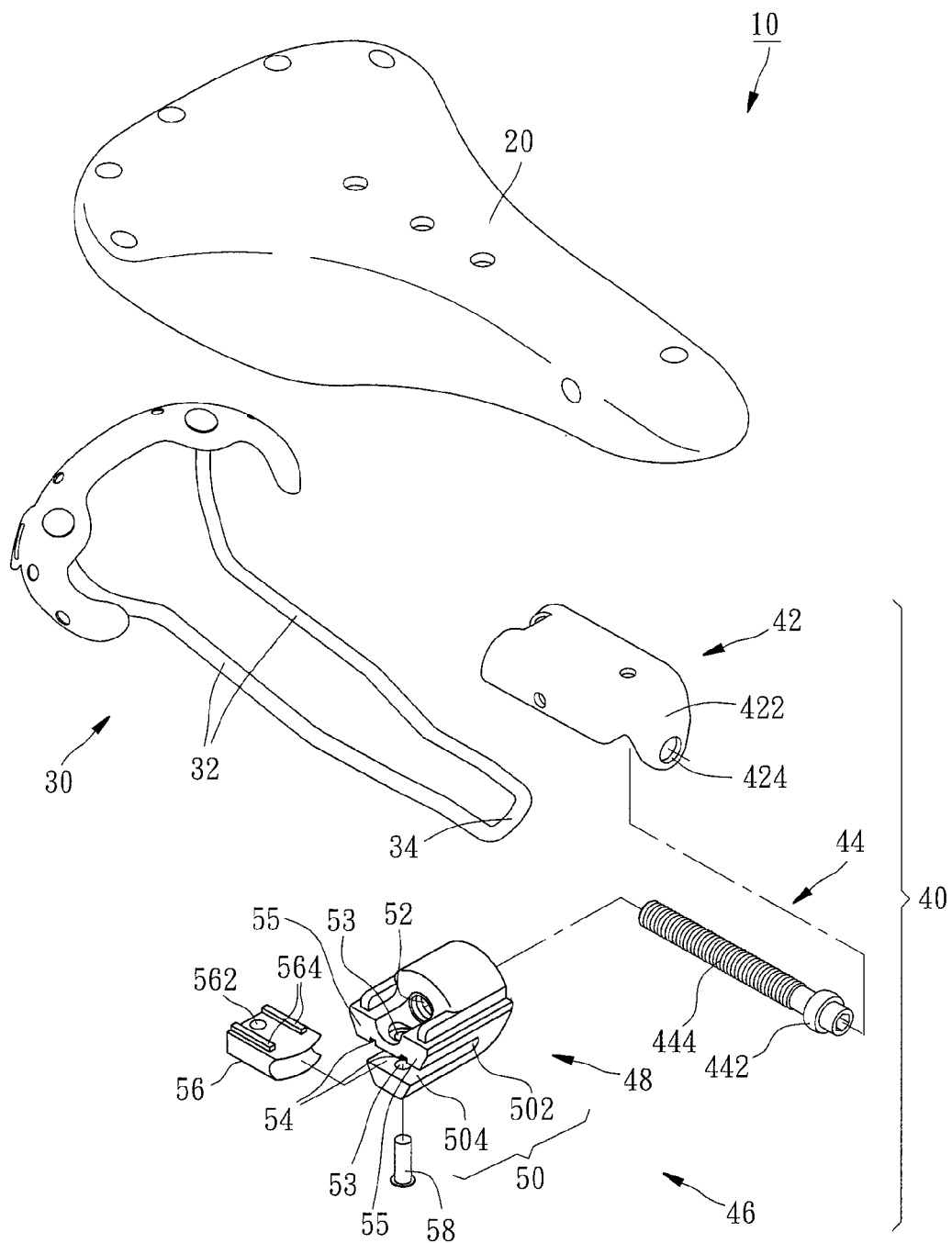
FIG. 2 is an exploded view of the leather bicycle saddle in accordance with the first embodiment of the present invention.

Referring to FIGS. 1 and 2, a leather bicycle saddle 10 in accordance with a first embodiment of the present invention is shown. The leather bicycle saddle 10 comprises a leather cover 20, an arc support 30 and an adjustment device 40.

The arc support 30 is mounted at a bottom side of the leather cover 20, comprising two opposing support rods 32. The two support rods 32 have respective front ends thereof connected to each other to form a head abutment portion 34, and respective rear ends thereof affixed to a rear side of the leather cover 20.

Figure 3:
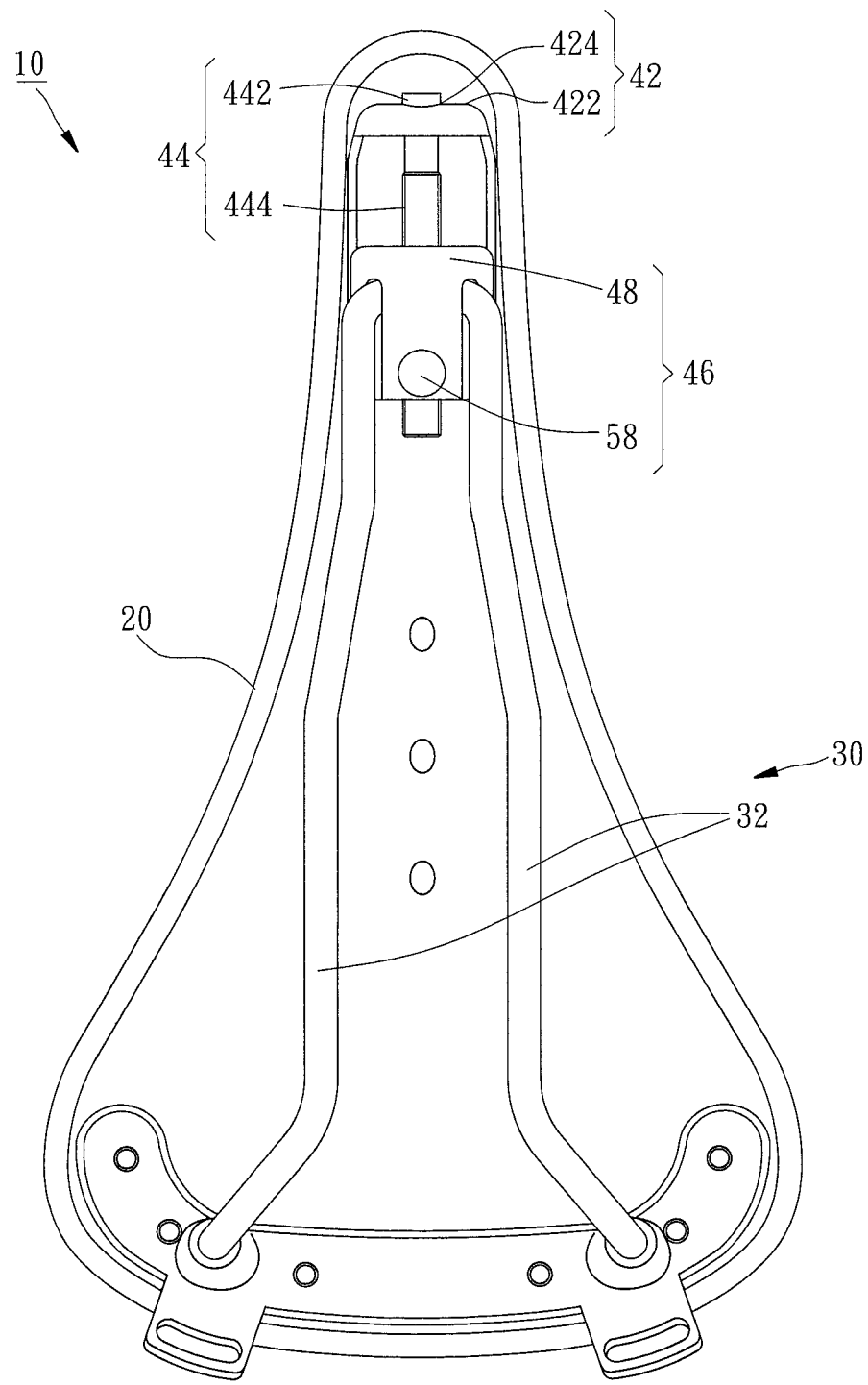
FIG. 3 is a bottom view of the leather bicycle saddle in accordance with the first embodiment of the present invention.

The adjustment device 40 is mounted at the bottom side of the leather cover 20, comprising a screw bolt holder 42, an adjustment screw bolt 44, and an adjustment seat 46. As illustrated in FIGS. 2 and 3, the screw bolt holder 42 is affixed to a front bottom side of the leather cover 20 by, for example, riveting. The screw bolt holder 42 comprises a stop wall 422 and a through hole 424 cut through the stop wall 422. The adjustment screw bolt 44 comprises a bolt head 442 and a screw shank 444. The bolt head 442 is abutted against the stop wall 422 of the screw bolt holder 42 and is rotatably received in the through hole 424 of the screw bolt holder 42. The screw shank 444 has one end thereof connected to the bolt head 442.

Figure 4:
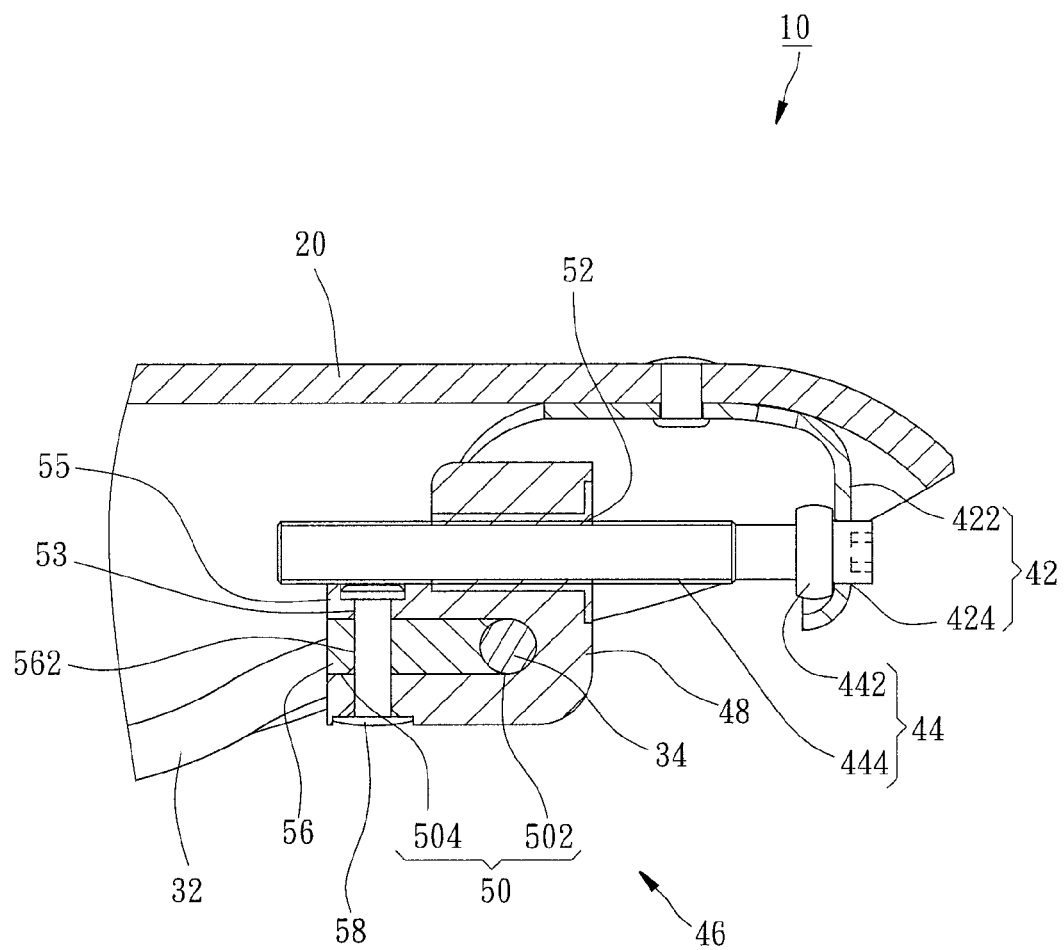
FIG. 4 is a sectional view of a part of the first embodiment of the present invention, illustrating the relationship between the arc support and the adjustment device.
Figure 5:
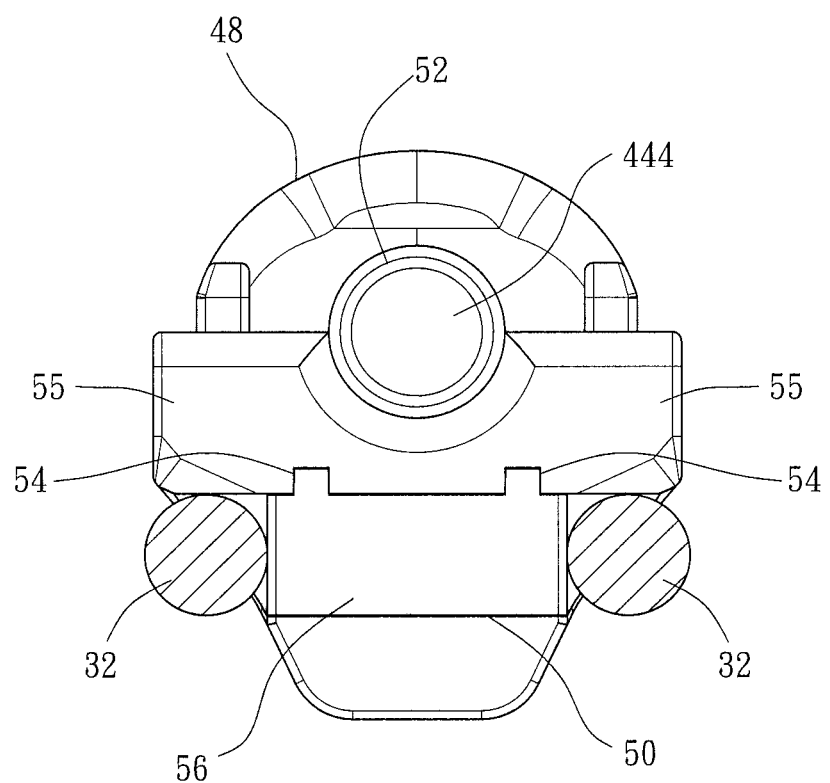
FIG. 5 is a rear side view of the adjustment device of the leather bicycle saddle in accordance with the first embodiment of the present invention.

Referring to FIGS. 2, 4 and 5, the adjustment seat 46 comprises a seat block 48, a stop block 56 and a fastener 58. The seat block 48 comprises a mounting slot 50, a screw hole 52 penetrating the seat block 48, and two lugs 55. The mounting slot 50 extends from a rear side of the seat block 48 toward an opposing front side thereof, defining an open end 504 and a closed end 502. The mounting slot 50 and the screw hole 52 are kept apart. The lugs 55 are disposed at two opposite lateral sides of the seat block 48 between the mounting slot 50 and the screw hole 52. The head abutment portion 34 of the arc support 30 is stopped at the closed end 502 of the mounting slot 50. When the adjustment seat 46 is kept in horizontal, the top edges of the support rods 32 are abutted against the bottom edges of the lugs 55 of the seat block 48 of the adjustment seat 46. The stop block 56 is detachably engaged in the open end 504 of the mounting slot 50 with one end thereof abutted against the head abutment portion 34 of the arc support 30. The surface of the stop block 56 that is abutted against the head abutment portion 34 mates with the configuration of the head abutment portion 34. Further, two first through holes 53 are respectively located in the seat block 48 at opposing top and bottom sides relative to the mounting slot 50. The stop block 56 comprises a second through hole 562. The fastener 58 is fastened to the first through holes 53 and the second through hole 562 to affix the stop block 56 to the mounting slot 50 of the seat block 48. The screw hole 52 is adapted for receiving the screw shank 444 of the adjustment screw bolt 44. Subject to the structure described above, the arc support 30 simply has the front part thereof abutted against the adjustment seat 46, and is kept apart from the screw bolt holder 42 and the adjustment screw bolt 44 at a distance without contact.

Further, at least one locating groove 54 is located at one sidewall of the mounting slot 50, for example, the top wall of the mounting slot 50; the stop block 56 comprises at least one locating rib 564 fitting the at least one locating groove 54. By means of putting the at least one locating groove 54 into engagement with the at least one locating rib 564, the seat block 48 and the stop block 56 are prohibited from being forced by a lateral force to rotate or displace relative to each other. In this embodiment, two locating grooves 54 are located at the top wall of the mounting slot 50 and, the stop block 56 comprises two locating ribs 564 fitting the two locating grooves 54. The gap, i.e., the vertical height of the open end 504 of the mounting slot 50 is slightly smaller than the thickness of the stop block 56 so that stop block 56 and the mounting slot 50 can be tightly mated with each other, avoiding displacement of the stop block 56 relative to the seat block 48 upon an external force during the process of the fastener 58 fastening to the first and second through holes 53, 562.

Further, in order to prevent noises due to impact between the adjustment seat 46 and the arc support 30, the contact area between the adjustment seat 46 and the arc support 30 is made out of plastics. In this embodiment, the seat block 48 and stop block 56 of the adjustment seat 46 are made out of engineering plastics and the peripheral wall of the screw hole 52 of the adjustment seat 46 is made of metal, and thus, the adjustment seat has high supporting strength and avoids noise generation.

After understanding of the structural details of the first embodiment, the operation and effects of the leather bicycle saddle 10 in accordance with the first embodiment of the present invention are outlined hereinafter.

Figure 6A:
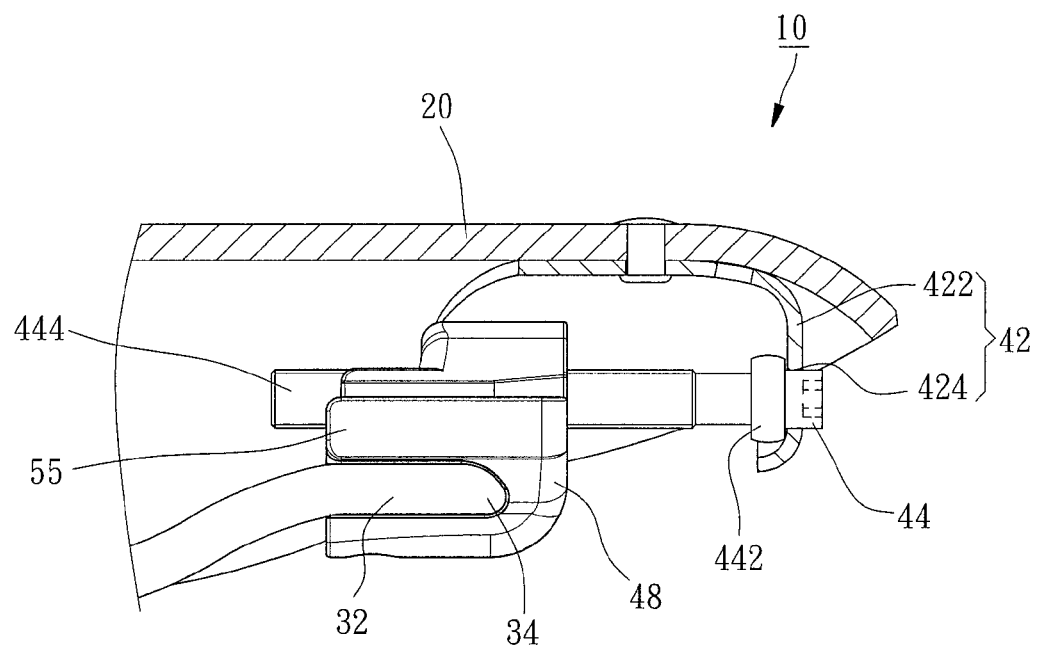
FIG. 6a is a schematic applied view of the first embodiment of the present invention, illustrating the relative positioning between the arc support and the adjustment device as the center of gravity of the bicycle rider is normal.
Figure 6B:
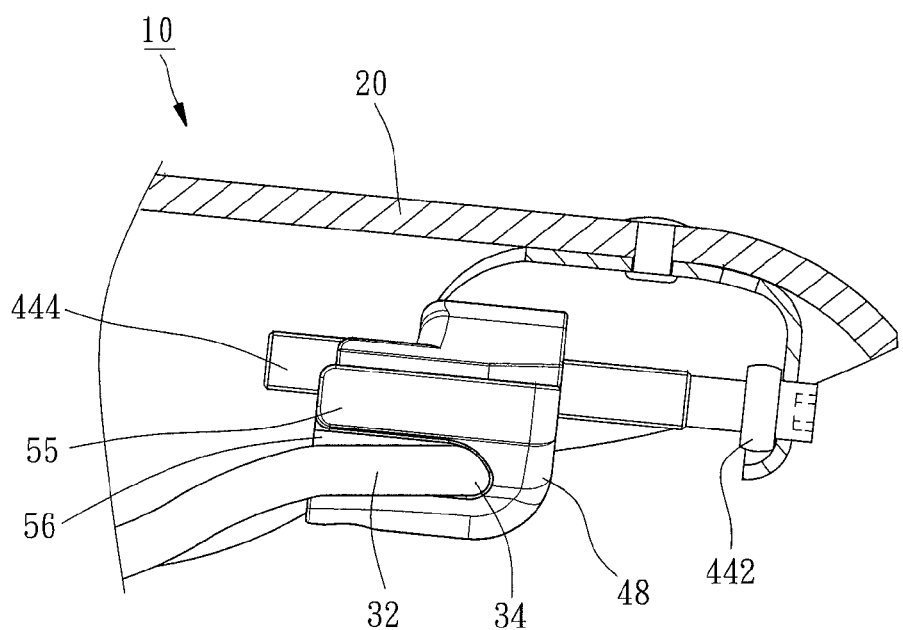
FIG. 6b is a schematic applied view of the first embodiment of the present invention, illustrating the relative positioning between the arc support and the adjustment device as the center of gravity of the bicycle rider shifted forwards.

Referring to FIGS. 6a and 6b, the leather bicycle saddle 10 can be adjusted according to the riding conditions. When the bicycle rider is riding on a slopeless or smooth road surface, the center of gravity of the bicycle rider is normally located at the center of the bicycle saddle, at this time, the bottom edges of the lugs 55 of the seat block 48 of the adjustment seat 46 are respectively abutted against the top edges of the support rods 32 of the arc support 30 (see FIG. 6a). Further, when the bicycle rider is riding uphill from flat, the bicycle rider will mostly move the center of gravity of the body to the front end of the bicycle saddle to increase the grip strength of the front wheel of the bicycle and the feet pedaling force. At this time, the seat block 48 of the adjustment seat 46 can be turned forwardly about the head abutment portion 34 of the arc support 30 (see FIG. 6b) to balance the tension of the leather cover 20. By means of biasing the seat block 48, the leather cover 20 can be more fitting to the inner thighs and crotch of the bicycle rider, thereby increasing the riding comfort. In addition to the function of the adjustment of the angular position of the seat block 48 of the adjustment seat 46 to fit different road conditions, the biasable characteristic of the seat block 48 of the adjustment seat 46 works as a spring or sponge to provide a cushioning effect for reducing the impact between the buttocks of the bicycle rider and the leather bicycle saddle 10, improving the overall riding comfort, in other words, the cushioning effect provided subject to the biasable characteristic of the seat block 48 makes the leather bicycle saddle 10 suitable for mounting bike applications.

Further, because the head abutment portion 34 of the arc support 30 is accommodated in the closed end 502 of the mounting slot 50 and because the top edges of the support rods 32 of the arc support 30 are respectively abutted against the bottom edges of the respective of the lugs 55 of the seat block 48 of the adjustment seat 46, the front ends of the support rods 32 can simply be kept in contact with the non-metal mounting slot 50, lugs 55 and stop block 56 of the seat block 48 of the non-metal stop block 46 and without touching the meta screw bolt holder 42 and the metal adjustment screw bolt 44, preventing generation of noises due to impact against metal materials. Further, the user can rotate the adjustment screw bolt 44 of the adjustment device 40 to adjust the tension of the leather cover 20 rapidly according to personal requirements.

Figure 7:
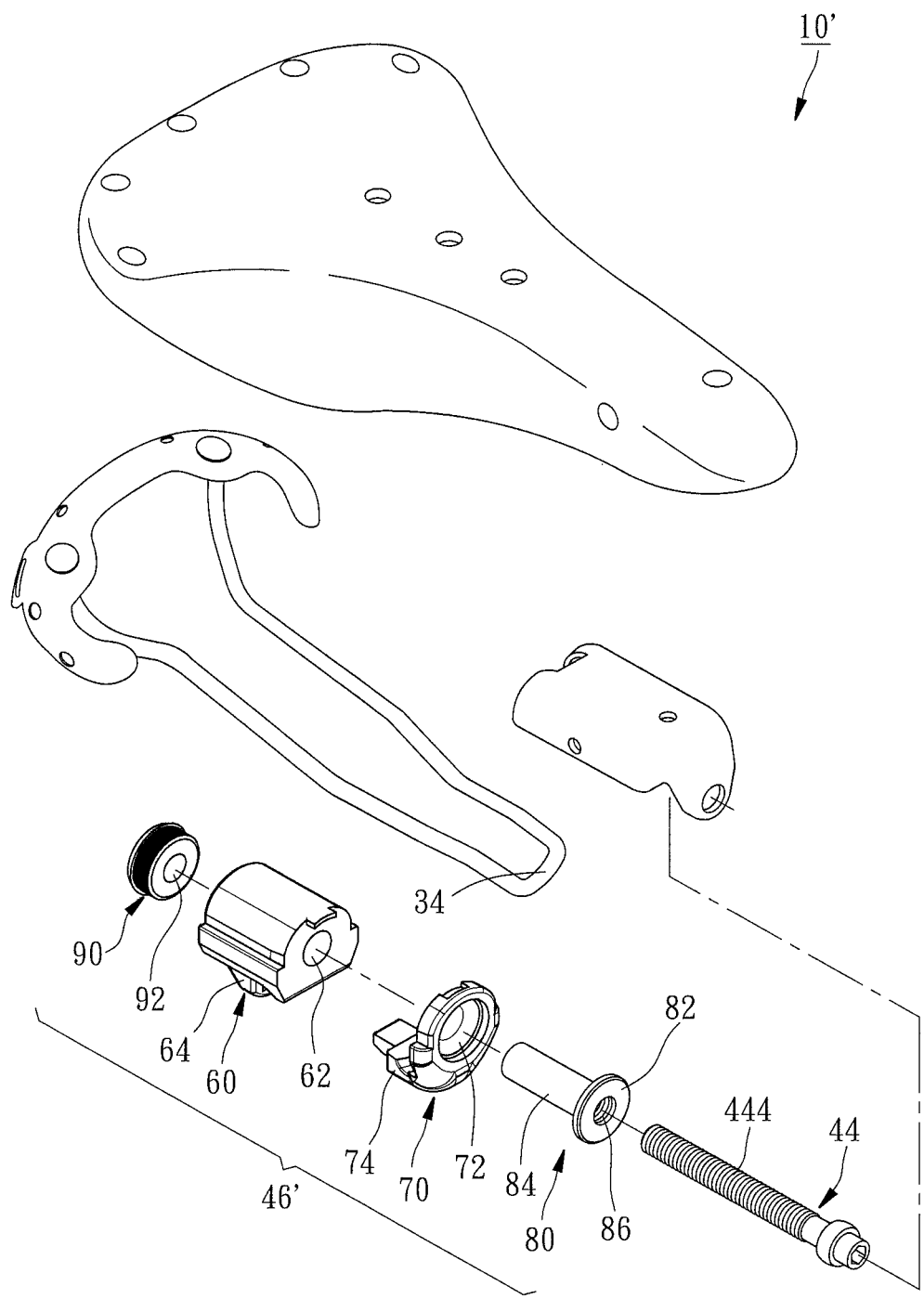
FIG. 7 is an exploded view of a leather bicycle saddle in accordance with a second embodiment of the present invention.
Figure 8:
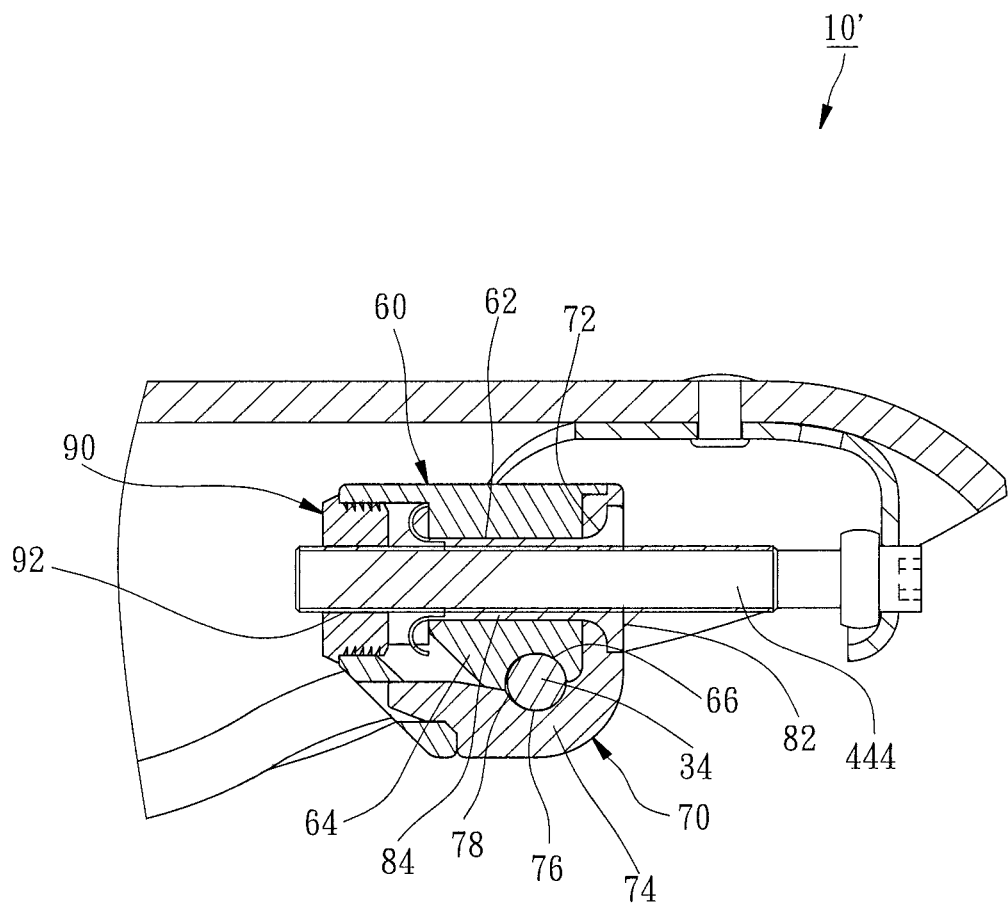
FIG. 8 is a sectional view of a part of the second embodiment of the present invention, illustrating the relationship between the arc support and the adjustment device.

Referring to FIGS. 7 and 8, a leather bicycle saddle 10' in accordance with a second embodiment of the present invention is shown. This second embodiment is substantially similar to the aforesaid first embodiment with the exceptions as follows:

The adjustment seat 46' comprises a seat block 60, a locating block 70 detachably fastened to the seat block 60 and a screw-in sleeve 80. The seat block 60 comprises a first through hole 62 and a first clamping portion 64. In this embodiment, the first clamping portion 64 is located at a bottom side of the seat block 60, defining a first clamping groove 66 that faces downward. The locating block 70 comprises a second through hole 72 corresponding to the first through hole 62, and a second clamping portion 74. The second clamping portion 74 defines a second clamping groove 76. After fixation of the locating block 70 to the seat block 60, the first through hole 62 and the second through hole 72 are kept in axial alignment, the first clamping groove 66 and the second clamping groove 76 are combined to create a retaining hole 78 for securing the head abutment portion 34.

The screw-in sleeve 80 is made of metal, comprising a head 82, a shank 84 extended from the head 82, and a screw hole 86 cut through the head 82 and the shank 84. In installation, the shank 84 of the screw-in sleeve 80 is inserted through the second through hole 72 of the locating block 70 into the first through hole 62 of the seat block 60, and then riveted to the seat block 60. After installation, the head 82 of the screw-in sleeve 80 is stopped against one side of the locating block 70, and, the screw hole 86 of the screw-in sleeve 80 is threaded onto the screw shank 444 of the adjustment screw bolt 44.

The adjustment seat 46' further comprises a rear cap 90 detachably fastened to the seat block 60 opposite to the locating block 70. The rear cap 90 defines therein a rear cap through hole 92. After fixation of the rear cap 90 to the seat block 60, the rear cap through hole 92 of the rear cap 90 is kept in axial alignment with the first and second through holes 62,72. Further, the rear cap through hole 92 is adapted for the passing of the adjustment screw bolt 44. The arrangement of the rear cap 90 prevents accumulation of dust or rainwater in the seat block 60.

The other structural details and effects of this second embodiment are substantially similar to the aforesaid first embodiment, and thus, no further detailed description in this regard will be necessary.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A leather bicycle saddle, comprising:
   a leather cover;
   an arc support mounted at a bottom side of said leather cover, said arc support having a front end terminating in a head abutment portion and an opposing rear end affixed to a rear side of said leather cover; and
   an adjustment device mounted at said bottom side of said leather cover, said adjustment device comprising a screw bolt holder, an adjustment screw bolt and an adjustment seat, said screw bolt holder being affixed to a front bottom side of said leather cover and comprising a stop wall and a through hole located at said stop wall, said adjustment screw bolt comprising a bolt head and a screw shank, said bolt head being abutted against said stop wall of said screw bolt holder and being rotatably received in said through hole of said screw bolt holder, said screw shank having one end thereof fixedly connected to said bolt head, said adjustment seat comprising a seat block and a stop block, said seat block defining therein a mounting slot and a screw hole, said mounting slot and said screw hole being kept apart, said mounting slot defining a closed end and an opposing open end, said head abutment portion of said arc support being abutted against said closed end of said mounting slot, said stop block being detachably engaged into said open end of said mounting slot, said screw hole being adapted for receiving said screw shank of said adjustment screw bolt, said adjustment seat being forwardly turnable about said head abutment portion from a horizontal position to an inclined position.

2. The leather bicycle saddle as claimed in claim 1, wherein said seat block of said adjustment seat comprises two lugs; said arc support comprises two support rods and a head abutment portion connected between front ends of said support rods, said support rods having respective top edges thereof respectively abutted against respective bottom edges of said lugs when said adjustment seat is disposed in said horizontal position.

3. The leather bicycle saddle as claimed in claim 1, wherein said seat block of said adjustment seat further comprises two first through holes defined therein at opposing top and bottom sides of said mounting slot; said stop block comprises a second through hole; said adjustment seat further comprises a fastener fastened to said first through holes and said second through hole to affix said stop block to said seat block.

4. The leather bicycle saddle as claimed in claim 1, wherein said seat block of said adjustment seat further comprises at least one locating groove located at one of opposing top and bottom sides relative to said mounting slot; said stop block comprises at least one locating rib respectively engaged into said at least one locating groove.

5. The leather bicycle saddle as claimed in claim 1, wherein said stop block has one end thereof configured to fit the configuration of said head abutment portion of said arc support and stopped against said head abutment portion.

6. The leather bicycle saddle as claimed in claim 1, wherein said seat block and said stop block of said adjustment seat are made out of engineering plastics; the peripheral wall of said screw hole of said adjustment seat is made of metal.

7. A leather bicycle saddle, comprising:
   a leather cover;
   an arc support mounted at a bottom side of said leather cover, said arc support having a front end terminating in a head abutment portion and an opposing rear end affixed to a rear side of said leather cover; and
   an adjustment device mounted at said bottom side of said leather cover, said adjustment device comprising a screw bolt holder, an adjustment screw bolt and an adjustment seat, said screw bolt holder being affixed to a front bottom side of said leather cover and comprising a stop wall and a through hole located at said stop wall, said adjustment screw bolt comprising a bolt head and a screw shank, said bolt head being abutted against said stop wall of said screw bolt holder and being rotatably received in said through hole of said screw bolt holder, said screw shank having one end thereof fixedly connected to said bolt head, said adjustment seat comprising a seat block and a locating block detachably fastened to said seat block, said seat block comprising a first clamping portion, said locating block comprising a second clamping portion, said seat block and said locating block defining therein a screw hole, said first clamping portion and said second clamping portion being combined to create a retaining hole for accommodating said head abutment portion after fixation of said locating block to said seat block, said screw hole being adapted for receiving said screw shank of said adjustment screw bolt, said adjustment seat being forwardly turnable about said head abutment portion from a horizontal position to an inclined position.

8. The leather bicycle saddle as claimed in claim 7, wherein said seat block comprises a first through hole; said locating block comprises a second through hole; said adjustment seat further comprises a screw-in sleeve, said screw-in sleeve comprising a head and a shank extended from said head, said head being stopped at one side of said locating block, said shank being inserted through said second through hole of said locating block and said first through hole of said seat block and fixedly secured inside said seat block, said screw-in sleeve having said screw hole defined therein; said screw hole cuts through said head and said shank.

9. The leather bicycle saddle as claimed in claim 8, wherein said seat block of said adjustment seat comprises two lugs; said arc support comprises two support rods and a head abutment portion connected between front ends of said support rods, said support rods having respective top edges thereof respectively abutted against respective bottom edges of said lugs when said adjustment seat is disposed in said horizontal position.

10. The leather bicycle saddle as claimed in claim 8, wherein said adjustment seat further comprises a rear cap detachably fastened to said seat block opposite to said locating block, said rear cap defining therein a rear cap through hole, the rear cap through hole of said rear cap being kept in axial alignment with said first through hole of said seat block and said second through hole of said stop block for the passing of said adjustment screw bolt after fixation of said rear cap to said seat block.

\* \* \* \* \*